April 7, 1953   J. M. ZEPRUN   2,633,813
BAIGLE CUTTING MACHINE

Filed July 13, 1949   2 SHEETS—SHEET 1

Inventor
Jack M. Zeprun
by Robert Cushman & Grover
Att'ys.

April 7, 1953   J. M. ZEPRUN   2,633,813
BAIGLE CUTTING MACHINE
Filed July 13, 1949   2 SHEETS—SHEET 2
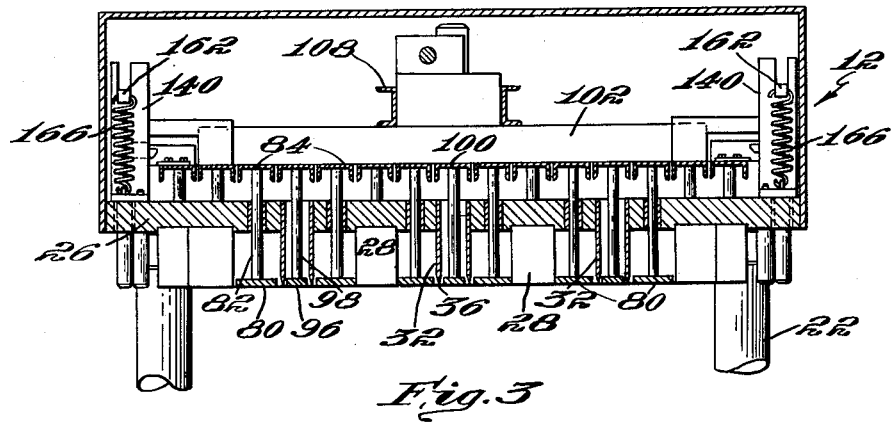
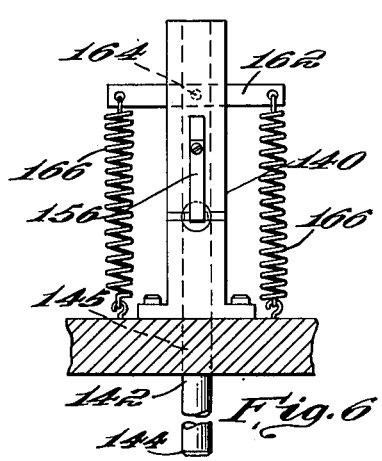
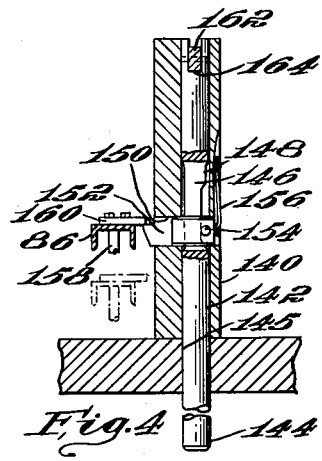
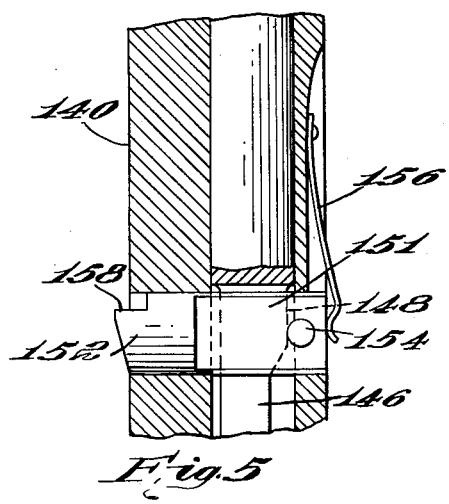
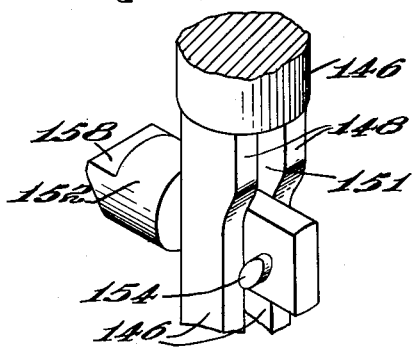
Inventor
Jack M. Zeprun Patented Apr. 7, 1953

2,633,813

UNITED STATES PATENT OFFICE 2,633,813

BAIGLE CUTTING MACHINE

Jack M. Zeprun, Roxbury, Mass.

Application July 13, 1949, Serial No. 104,520

4 Claims. (Cl. 107—21)

This invention relates to machines for cutting sheet material and in particular to improvements in a baigle cutting machine of the kind disclosed and described in my Patent No. 2,523,178 issued September 19, 1950.

In the foregoing application there is a battery of cutters supported in fixed position above a movable elevator plate upon which dough may be placed and raised into contact with the cutters to cut from the dough a plurality of pastries, specifically annular pieces for making baigles. In the foregoing application ejector means in the form of plungers are assembled with the individual cutters, there being two types, annular shaped ejectors so as to operate between the outer and inner cutting edges of the concentrically arranged cutters which cut the annular or ring-like pieces and circular shaped ejectors so as to operate within the inner circular cutters on the circular pieces. Both sets of ejectors are raised by upward movement of the elevator plate as it approaches the cutters so as to be drawn away from the cutting edges during the penetration of the cutters into the dough. At the completion of the cutting and as the elevator plate descends the annular ejectors follow the movement of the elevator plate and press against the rear sides of the annular pieces of dough and push them away from the cutting edges so that they follow the elevator plate and are carried thereby to a discharged position. The center ejectors, however, are latched in their uppermost position and held there until the annular pieces are removed from the elevator plate whereupon the latch is released and the center ejectors are allowed to fall and push the center pieces out of the center cutters so that they fall to the surface of the elevator plate. Some difficulty was experienced with sticking of the annular pieces to the cutting edges and the present invention is concerned with correcting this undesirable feature without in any way sacrificing the advantageous features of the prior machine.

To this end and as herein illustrated the outer ejectors, that is the ejectors for separating the annular pieces of dough, are latched in a retracted position as were the center ejectors in the prior machine, but in contradistinction they are automatically released at a predetermined point in the descent of the elevator plate so as to fall against the rear sides of the severed pieces and to impart a sharp blow thereto which drives them clear of the cutting edges so suddenly that they do not have a chance to adhere to the cutting edges and at a point in the descent of the elevator plate where the pieces will be driven flat against the tray on the elevator plate so as to occupy substantially their original positions and hence without opportunity to turn in mid-air or to become displaced with respect to each other.

The construction and operation of the machine will now be described in greater detail with reference to the accompanying drawings wherein:

Fig. 3 is a vertical elevation of the cutting head to somewhat larger scale taken on the line 3—3 of Fig. 2;

Fig. 4 is a fragmentary elevation, partly in section, showing the latching means;

Fig. 5 is a fragmentary portion of the latching means to larger scale;

Fig. 6 is a detail of the spring return for the latching means; and

Fig. 7 is an isometric view of the latch block.

Figure 1:
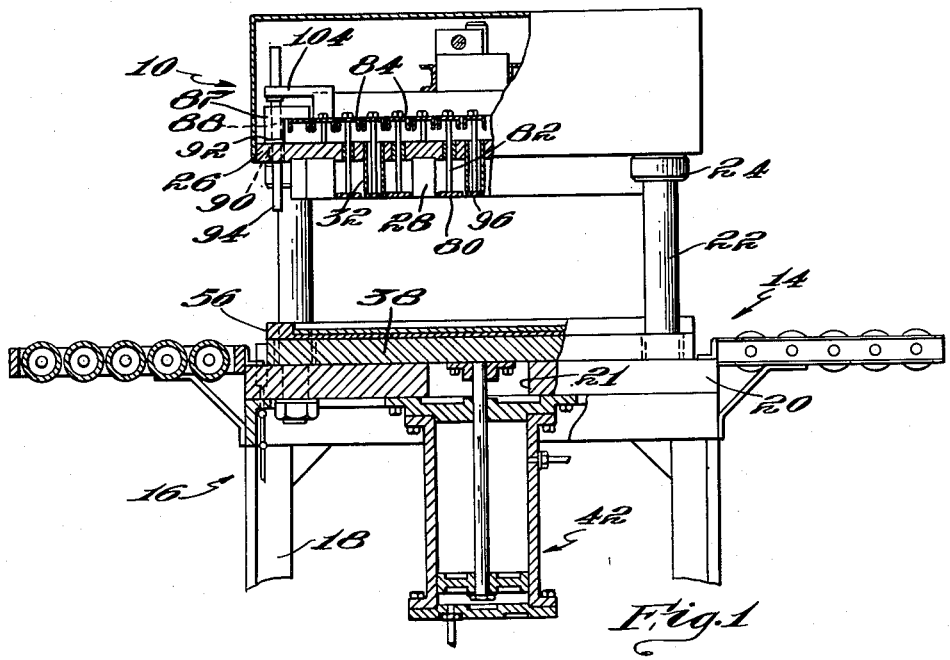
Fig. 1 is a vertical elevation partly in section showing the improved machine.

Referring to Fig. 1, the machine 10 is illustrated as comprised essentially of a cutter head 12, a support 14 for receiving the raw dough for movement into engagement with the cutters carried by the cutter head, and a bench or table 16 for supporting the aforesaid parts in operating relation to each other. The bench 16 has four legs 18 to the upper ends of which is rigidly attached, as by welding or other suitable means, to a rigid rectangular bed plate 20 having a flat upper surface and a central opening 21 therethrough from top to bottom. As illustrated, four posts 22 are fastened to the bed plate 20 at the corners thereof in vertical positions, and near their upper ends have secured thereto collars 24 on which rest a horizontal, substantially rectangular, rigid head plate 26, the surface of which is parallel to that of the bed plate. The head plate 26 constitutes a support for the cutters and is fixed in position, that is, does not have vertical movement itself with respect to the bed plate 20. In the lower surface of the head plate 26 there are fixed a plurality of cutters 28 and 32 (Figs. 1 and 3) concentrically arranged, the former being hexagonal and the latter annular. As thus arranged, when the dough and cutters are brought into engagement, there will be cut from the dough an annular piece of dough substantially in the shape of an annular doughnut and a circular piece representing the material removed from the center thereof.

To bring the dough and cutters together to effect cutting, there is situated on the bed plate 20 an elevator plate 38 (Fig. 1) upon which a tray 56 for receiving a sheet of dough may be placed. A piston and cylinder assembly 42 is provided for raising and lowering the elevator plate so as to engage the dough resting in the tray with the cutters and then return the tray to discharge position for removal of the severed sheet of dough, as described in the aforementioned application.

After a tray of dough has been placed upon the elevator plate 38 and the latter has been raised into engagement with the fixed cutters supported in the cutter head, as heretofore described, it is desirable to expel both the annular piece of dough which will constitute the baigle when finally cooked and the center piece which is removed therefrom. To this end there are provided ejectors in the form of plungers associated with the cutters 28 and 32. As illustrated in Fig. 3, the plungers or ejectors for expelling the annulus or piece of dough are in the form of rings 80 (Figs. 2 and 3) situated in the annular spaces between the hexagonal cutters 28 and the circular cutters 32, the ejectors being movable vertically within these spaces. To effect vertical movement of the ejectors 80 there are attached to the upper side of each ejector a pair of rods 82 (Figs. 1 and 3) which extend vertically upward through the head plate 26 and are attached to horizontally arranged parallel channel bars 84, the latter being connected at their opposite ends to a pair of parallel spaced channel bars 86 (Fig. 2) which form the side members of a rigid frame 85 situated at the upper side of the head plate 26. The frame 85, which is constituted by the channel members 84 and 86 is supported on the head plate by laterally projecting bracket pieces 87 fastened to the channel bars 86 through which pass four vertically arranged spindles 88 situated near the corners of the head plate. The spindles are supported for vertical movement in apertures 90 formed in the corners of the head plate 26 and have collars 92 thereon which underlie the under sides of the brackets 87 and effect upward movement of the frame as the spindles are raised. The collars limit downward movement of the spindles 88 by engagement with the upper surface of the head plate 26. The spindles extend below the head plate 26, and their lower ends 94 provide, as will appear hereinafter, means for raising the frame 85 and hence the ejectors 80 to move them upwardly with respect to the cutting edges 30 and 36. Within each of the inner circular cutters 32 there is a disk-shaped ejector 96 which is movable vertically within the cutter. Vertical movement of these ejectors 96 is effected by rods 98 attached to the upper side of the ejector and connected to horizontally arranged parallel channels 100 situated above the plate 26 and alternating with the channel members 84. The channel members 100 are attached at their opposite ends to a pair of spaced, parallel, horizontally arranged channel members 102 to form a rigid frame 101. Fixed to the frame 101 near the corners thereof (Fig. 2) are laterally extending bracket pieces 104 having vertical apertures in their outer ends for receiving through them the upper ends of the spindles 88. The frame 101 rests on the frame 85, and hence vertical movement of the frame 85 will effect vertical movement of the frame 101 and thus raise the center ejector disks relative to the cutting edges of the cutters.

It is desirable to expel the annular pieces of dough first and to allow them to return with the tray to the lowermost position thereof on the bed plate. The tray is then removed from the machine, the cut dough is raised, and then the raised pieces are dumped into a kettle of boiling water without having to separate the individual pieces or to pick out the center pieces. Separation of the pieces will take place itself during boiling which is continued for a sufficient length of time partially to cook the pieces and round them out, whereupon they are placed in an oven and baked. To this end the ejectors, after they have been raised to permit the cutters to penetrate the dough, are arranged to be released successively first to expel the annular pieces of dough and then to expel the center pieces. To this end latch means 119 (Fig. 2) is provided for holding the center ejectors 96 in their raised position until the tray has descended with the elevator plate to its initial position and the baker has had time to remove the tray from the machine. The aforesaid latch means includes a pair of vertical posts 120, means for releasably clamping the frame 101 to the posts, and a lever 133 for releasing the same, the details of which are described in the aforementioned application.

Figure 2:
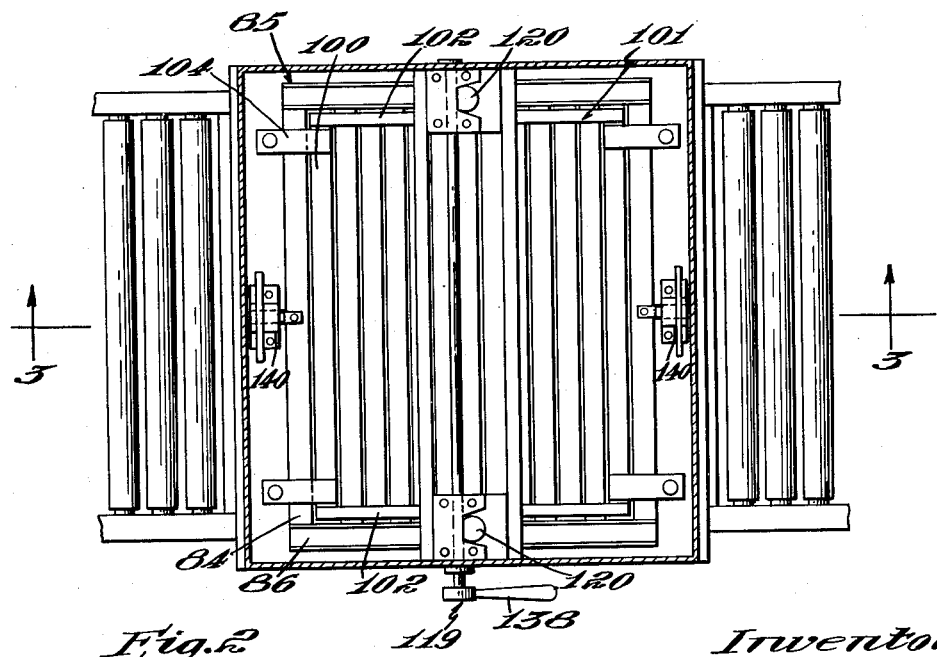
Fig. 2 is a plan view of the machine.

In accordance with the present invention, the frame 85 which carries the outer ejectors 80 is latched in a withdrawn position and automatically released after the elevtor plate has started its descent but before it has traveled any considerable distance so as to allow the ejectors to fall and strike the back side of each of the annular pieces of dough a sharp clean blow and hence to expel the dough so quickly that it will not have a chance to stick to the cutting edges of the cutters. This takes place before the inner ejectors are released, as heretofore explained. To this end vertical posts 140 are fastened as by bolts at their lower ends to the head plate 26 midway between the spindles 88, as shown in Figs. 2, 3 and 4, and at opposite sides thereof. The posts 140 are hollow and within each is slidably mounted a spindle 142, the lower end 144 of which extends through a hole 145 in the head plate and terminates at the same level as the lower end of the spindle 88 so that as the elevator plate rises it will engage this spindle simultaneously with the spindle 88. A portion of each spindle within its post is cut away to provide a depressed cam surface 146 and a shoulder 148 and extending lengthwise of the cut-away portion and transversely of the spindle is a through slot 151. A transverse slot 150 is formed through each post and in the slot there is slidably pressed a T-shaped latch block 152, the leg of which freely passes through the slot 151. A pin 154 is fixed in the leg of the latch block so that its opposite ends bear on said cam surface at opposite sides of the slot 151, and a flat spring 156 fastened to the post normally bears against the end of the leg pressing the block inwardly so that the pin 154 is held against the cam surface. The crosshead of each latch block has a horizontal lip 158 thereon arranged to engage the under side of a latch plate 160 (Fig. 4) fastened to the top of the frame 85 when the latch block occupies its innermost position, that is, when the pin engages the cam surface 146. The upper end of each post is slotted for movably receiving a bar 162 the middle of which is pivotally fastened in a kerf 164 at the top of the spindle 142. A coiled spring 166 is fastened to each end of each bar 162 and to the plate 26 so as to urge the spindles 142 downwardly. As thus constructed when the elevator plate rises the spindles 142 rise which brings the cam surfaces 146 opposite the pins 154 so that the springs 156 press the latch blocks inwardly into the path of the rising latch plates 160. The frame 85 is raised above the latch plates 160, pushing by the latches which yield, and is then hung on the latches by engagement of the lips 158 with the under sides of the plates 160. As the elevator plate begins to descend, the spindles 142 follow by reason of the springs 166 but until the shoulders 148 reach the pins 154 the latches will remain engaged with the latch plates 160. As soon as the shoulders 148 reach the pins 154 they cam the latches rearwardly withdrawing the lips 158 from beneath the latch plates 160 so that the frame 85 is allowed to fall into contact with the head plate 26 whereupon it comes to an abrupt stop. The blow imparted to the piece of dough by the ejector is sufficient to drive the pieces of dough from the cutting edges cleanly and the abrupt stop of the ejector is sufficient to disengage the piece from the ejector by reason of the momentum of the piece. By arranging the distance of the fall just right, the pieces when expelled will be driven against the tray on the descending elevator plate forcibly enough so that they will not have an opportunity to turn in the air and hence get out of position.

The operation of the machine is like that of the pending application in that a sheet of dough is placed in the tray 56, the tray is placed on the elevator plate and fluid is then admitted to the lower end of the cylinder 42 to raise the piston and hence raise the elevator plate toward the cutters. As the elevator plate rises, and just before the surface of the dough comes into engagement with the cutting edges of the cutter, the upper marginal surface of the tray engages the lower ends 94 of the spindles 88. As the tray is raised further to cause penetration of the dough, the spindles 88 are raised, thus raising the frames 85 and 101 and hence to retract the ejectors 80 and 96. At the same time the spindles 142 are raised so as to allow the latch blocks 152 to be pressed inwardly beneath the latch plates on the frame 85. As soon as the cutting has been effected, the tray is lowered by cutting off the driving fluid at the lower end of the piston and by introducing fluid to the upper end of the piston, whereupon the elevator plate descends thereby separating the tray from the cutters. The latch blocks 152 being engaged beneath the latch plates 160 hold the frame 85 elevated so that the annular pieces of dough are not expelled from the cutting edges of the cutter until the tray has moved downwardly a predetermined distance. During the initial downward movement of the tray the spindles 88 and 142 descend but until the shoulders 148 engage the pins 154, the latches remain engaged. When the latch blocks are withdrawn by engagement of the shoulders with the pins, the frame 85 and hence the ejectors 80 fall and strike the annular pieces of dough with sufficient force to propel them onto the tray which is already some distance below the cutting edges, this distance being carefully determined by previous experiment so that the pieces of dough do not have time to turn in mid-air or to become displaced relative to each other on the tray. Initial downward movement of the spindles 88 will also bring about engagement of the latch means 119 referred to heretofore to lock the upper frame 101 in its raised position, this being permitted by reason of the fact that the brackets 104 may slide relatively to the spindles 88. When the elevator has returned to its normal position on the bed plate and the filled tray has been removed from the machine, an empty tray or pan may be placed below the cutters, whereupon the lever 138 may be actuated to release the latch means 119 and hence permit the frame 101 to return to its lowermost position against the top of the frame 85 and at the same time to cause the center ejectors 96 to expel the center pieces of dough from the center cutters. The expelled center pieces will fall onto the empty tray on the elevator plate and may be removed for re-working.

It should be understood that the present disclosure is for the purpose of illustration only, and that this invention includes all modifications and equivalents which fall within the scope of the appended claims.

I claim:

1. In a machine for making baigles, a gang of cutters of the kind to cut from a sheet of dough a plurality of substantially circular pieces of dough and a support for receiving the sheet of dough, said cutters and support being relatively movable to move the cutters and support to and from each other, a series of ejectors associated with the cutters to eject the severed pieces of dough from the cutters as the cutters and support move away from each other said ejectors normally occupying a position flush with the cutting edges of the cutters but being movable to an elevated position above the cutting edges, means operable by movement of the cutters and support together to sever pieces from the dough to raise the ejectors to their elevated position, latch means engageable with the ejectors at the elevated position to hold them elevated until the support has moved an appreciable distance away from the cutters and then to release the ejectors so that they fall into engagement with the top of the pieces thereby expelling the pieces from the cutters.

2. In a machine for making baigles, a gang of cutters of the kind to cut from a sheet of dough a plurality of substantially circular pieces of dough, a support movable to and from the cutters to bring the sheet of dough resting thereon into engagement with the cutters to cut from the latter pieces of dough, means for moving the support to and from the cutters, a movable ejector normally flush with the edge of each cutter said ejector being movable to an elevated position above the cutting edge, means operable by movement of the support into cutting position to raise the ejectors to said elevated position, a latch at said elevated position of the ejector for holding the ejectors elevated, means operable by movement of the support away from the cutting position to release the latch and hence to release the ejectors allowing the latter to fall to their initial point relative to the cutting edges and to strike the top sides of the severed pieces, and means for bringing the ejectors to an abrupt stop flush with the cutting edges.

3. In a machine for making baigles, a gang of cutters of the kind to cut from a sheet of dough substantially circular pieces of dough, a support for receiving the sheet of dough, said cutters and support being relatively movable to move the cutters and support to and from each other, means for effecting cutting movement, a plurality of ejectors associated with the cutters to eject the severed pieces of dough from the cutters as the cutters and support move away from each other, a frame carrying the ejectors said frame being movable from a position in which the ejectors are flush with the cutting edges of the cutter to an elevated position, a retractable latch at the elevated position of the frame arranged to underlie the ejector frame, means yieldingly holding the latch in a position engaging the frame and holding it elevated, and means operative by descent of the support to retract the latch from engagement with the frame to release the frame and allow the ejectors to fall into engagement with the top sides of the severed pieces.

4. In a machine for making baigles, a gang of cutters of the kind to cut from a sheet of dough annular pieces of dough and a support upon which the sheet of dough may be placed, said cutters and support being relatively movable to cut pieces from said sheet of dough, means for effecting such relative movement, a plurality of ejectors associated with the cutters to expel the severed pieces of dough therefrom, a frame supporting said ejectors said frame being movable from a position in which the ejectors are flush with the cutting edges of the cutter to an elevated position, means for raising said frame to elevate the ejectors above the top of the pieces during the cutting operation, a retractable latch arranged to underlie the ejector frame when it is elevated, means yieldably holding the latch engaged beneath the elevated frame, cam means operable by movement of the support away from the cutters to retract the latch and hence to release the frame, and means operable by movement of the support toward the cutters to reset the latch.

JACK M. ZEPRUN.

REFERENCES CITED

The following references are of record in the file of this patent:

UNITED STATES PATENTS

| Number | Name | Date |
|---|---|---|
| 184,895 | Parr | Nov. 28, 1876 |
| 185,351 | Rannie | Dec. 12, 1876 |
| 1,847,150 | Ward et al. | Mar. 1, 1932 |